June 7, 1927.

F. W. DANIEL, SR 1,631,250

BOLTLESS SLEEVE COUPLING

Filed June 22, 1925

Inventor

F. W. Daniel, Sr.

By C. A. Snow & Co.

Attorneys.

Patented June 7, 1927.

1,631,250

UNITED STATES PATENT OFFICE.

FREDERICK W. DANIEL, SR., OF JACKSONVILLE, FLORIDA.

BOLTLESS SLEEVE COUPLING.

Application filed June 22, 1925. Serial No. 38,813.

This invention aims to provide novel means for joining the ends of a pair of rods or the like, securely but separably, without resort to bolts and the like.

Figure 1:
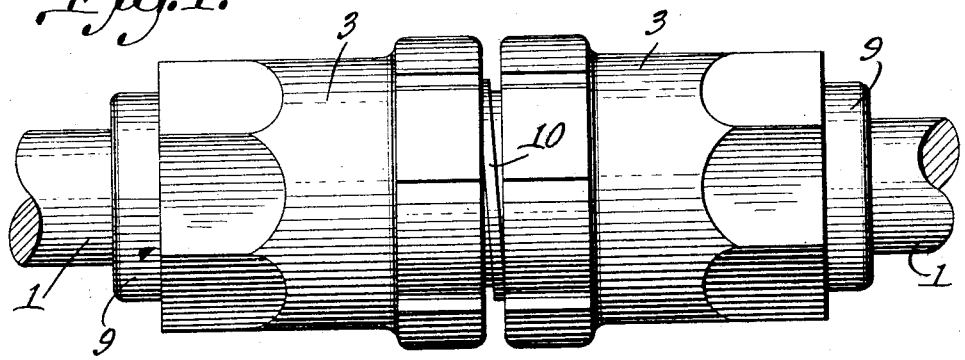
Figure 2:
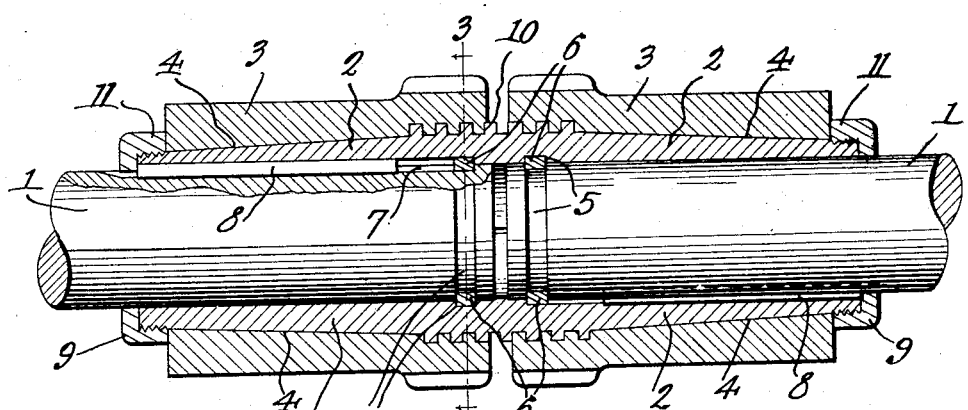
Figure 3:
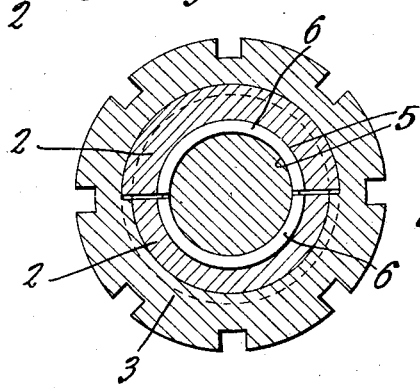

Figure 1 is an elevation, Figure 2 a longitudinal section, and Figure 3 a section on the line 3—3 of Fig. 2.

The device comprises, in combination with the members 1 to be joined, laterally separable trough-shaped retainers 2 disposed about said members and receiving the ends thereof, and sleeves 3 threaded on the retainers, the sleeves and the retainers having cooperating longitudinally inclined conical surfaces 4 which coact to move the retainers inwardly with respect to said members, when the sleeves are moved toward each other on the threads 10. The members 1 and the retainers 2 have transverse circumferential seats 5 receiving laterally separable semi-circular keys 6. The device is further characterized by the fact that the members 1 and the retainers 2 have longitudinal seats 7 communicating at their inner ends with the seats 5, if desired, and receiving keys 8 which, like the keys 6, are removable, the longitudinal keys 8 being engaged at their outer ends by securing devices 9, such as lock nuts or rings which not only retain the keys 8, but, as well, comprise parts 11, which, engaging the outer ends of the sleeves 3, prevent the sleeves from backing off accidentally and releasing the retainers 2.

The operation of the device will be understood readily when the drawing is read in connection with the specification, and it is clear that the device affords an efficient but readily-separable connection wherein bolts, and the like, are not used.

A preferred form has been shown, but a mechanic, working within the scope of what is claimed, may make such changes as his skill may suggest, without departing from the spirit of the invention.

The device improves generally and enhances the utility of, couplings of the sort to which the invention appertains.

What is claimed is:—

1. The combination with members to be joined, of laterally separable retainers disposed about said members and receiving the ends thereof, sleeves threaded on the retainers, the sleeves and the retainers having cooperating longitudinally inclined surfaces which coact to move the retainers inwardly with respect to said members when the sleeves are threaded toward each other, said members and the retainers having longitudinal seats, keys in the seats, and securing devices mounted on the retainers and engaging both the keys and the sleeves.

2. The combination with members to be joined, of laterally separable retainers disposed about said members and receiving the ends thereof, sleeves threaded on the retainers, said members and the retainers having transverse seats, laterally removable keys in the seats, the said members and the retainers having longitudinal seats, longitudinal keys in the last-specified seats, and securing devices mounted on the retainers and engaging the sleeves and the longitudinal keys.

3. A device of the class described, constructed as set forth in claim 2, and further characterized by the fact that the securing devices are in the form of lock nuts threaded on the retainers and engaging the outer ends of the sleeves, the nuts embodying parts which engage the outer ends of the longitudinal keys.

In testimony that I claim the foregoing as my own, I have hereto affixed my signature.

FREDERICK W. DANIEL, SR.